Figure 1:
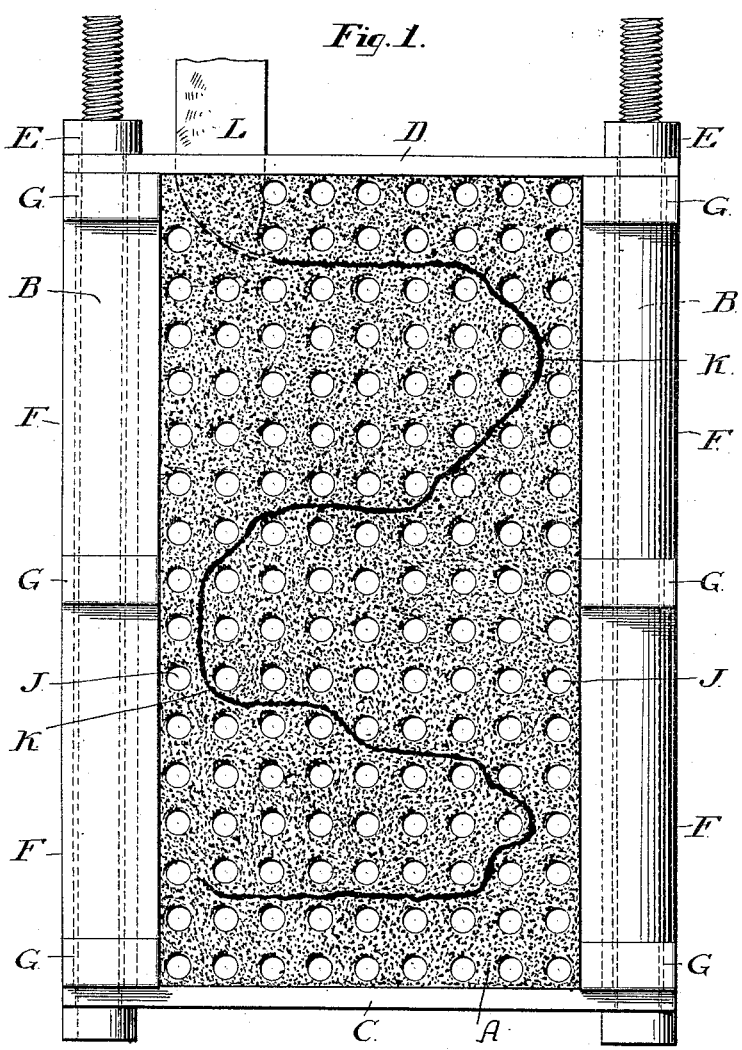

(No Model.) 2 Sheets—Sheet 1.

I. KITSEE.
ELECTRODE FOR SECONDARY BATTERIES.

No. 443,454. Patented Dec. 23, 1890.

Witnesses:
F. Norman Dixon
Lewis Attmaier

Isidor Kitsee, Inventor
By his Attorneys,
W. C. Strawbridge,
J. Bonsall Taylor (No Model.) 2 Sheets—Sheet 2.

I. KITSEE.
ELECTRODE FOR SECONDARY BATTERIES.

No. 443,454. Patented Dec. 23, 1890.

Witnesses: Isidor Kitsee Inventor

UNITED STATES PATENT OFFICE.

ISIDOR KITSEE, OF CINCINNATI, OHIO, ASSIGNOR TO MAYER SULZBERGER, TRUSTEE, OF PHILADELPHIA, PENNSYLVANIA.

ELECTRODE FOR SECONDARY BATTERIES.

SPECIFICATION forming part of Letters Patent No. 443,454, dated December 23, 1890.

Application filed February 11, 1890. Serial No. 340,041. (No model.)

*To all whom it may concern:*

Be it known that I, ISIDOR KITSEE, a citizen of the United States, residing at Cincinnati, county of Hamilton, in the State of Ohio, have invented certain new and useful Improvements in Secondary Batteries, of which the following is a specification.

As is well known, secondary batteries are generally formed of plates of lead provided with active material usually consisting of an oxide of lead.

In the use of secondary batteries of this description the plates or electrodes eventually become unduly brittle and warped, with the result that jarring occasions their disintegration and the final separation of the active material from its support. The buckling of the plates causes the positive and negative elements of the battery to come into contact by which short circuits are established and the battery rendered useless. In the case of the positive plate or electrode of the battery, buckling is to some extent occasioned by the fact that in the use of the battery the oxide of lead upon the plate increases in volume without a corresponding increase of plate surface to sustain it. The separation of the active material from the plates or electrodes increases the resistance of the battery by reason of the formation of a layer of sulphate of lead between the active material and the surface of the containing plate and occasions a consequent decrease of the electrical energy of the battery.

In secondary batteries of the usual construction the plates employed are capable of containing but a certain limited amount of oxide of lead and therefore in batteries of this description it has been found necessary to employ a great number of plates or elements.

In Letters Patent of the United States No. 400,226, dated March 26, 1889, and No. 406,916, dated July 16, 1889, granted upon my application, are shown and described electrodes for a secondary battery consisting of supporting plates unsusceptible to electrolysis or to corrosive action and provided upon one or more of their surfaces with a layer of a suitable element substance, my present invention is embodied in an electrode in which the active material is contained within a frame of rubber or of other material incapable of being acted upon by electricity or by the acid of the battery fluid or electrolyte.

Figure 2:
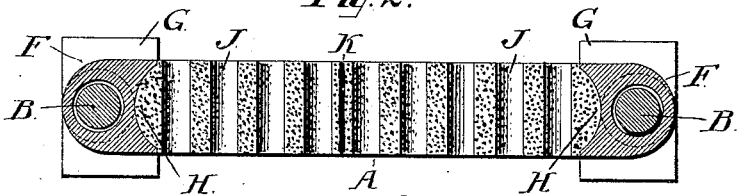
Figure 3:
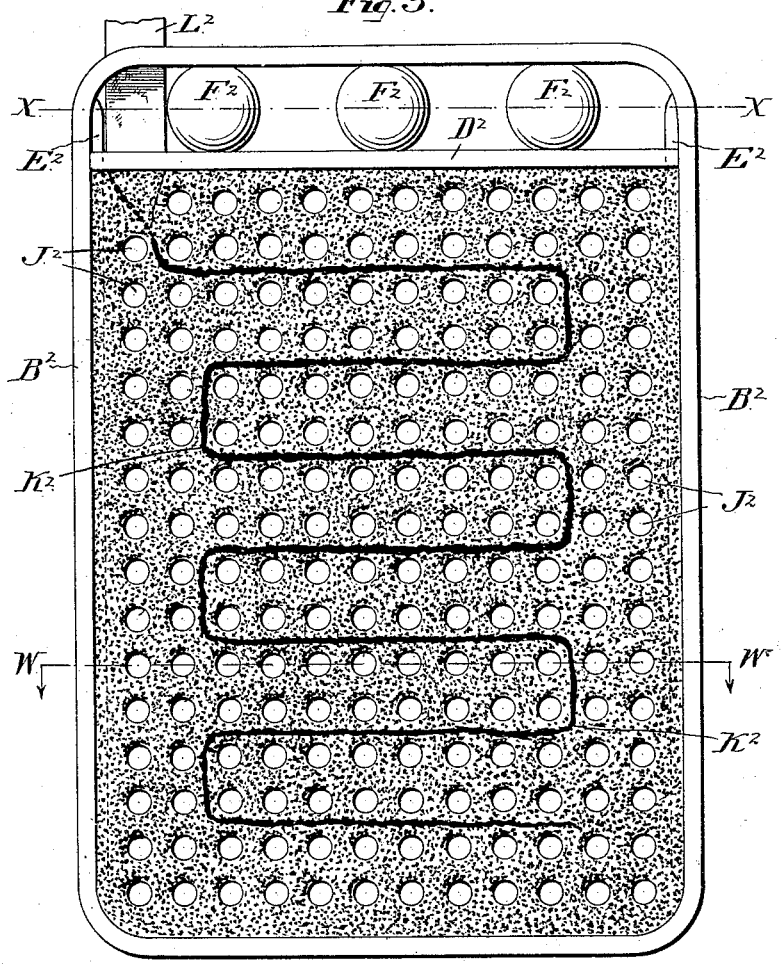
Figure 4:
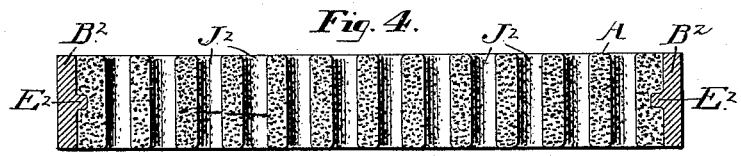
Figure 5:
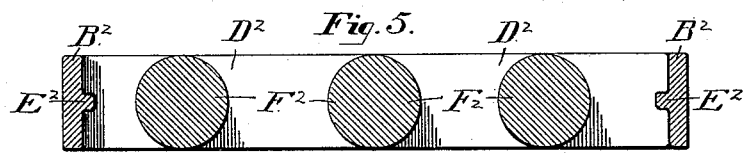

In the drawings, Figure 1 is an elevational view of an electrode embodying my invention. Fig. 2 is a horizontal sectional view of the electrode shown in Fig. 1. Fig. 3 is a side elevation of a modified form of electrode embodying my invention, and Figs. 4 and 5 are horizontal sectional views upon the lines *w w* and *x x* respectively of Fig. 3.

In the electrode shown in Figs. 1 and 2, A is a mass or block of suitable active material which is inclosed or contained in a frame which consists of two vertical hard rubber posts B B which pass through longitudinal holes in soft rubber posts or side pieces F F, and through holes formed in the respective ends of hard rubber plates C and D forming the bottom and top supports of the active material. The posts B B are, at their lower ends, provided with heads, and, at their upper ends, with screw threads, and nuts E, by which the frame and its contained active material are bound together.

The posts or side pieces F F are, at their inner sides, concave, as shown at H, in order to more securely hold the active material in place and they are provided with lateral projections G G which serve to separate the electrodes when they are in place in the battery cell. The posts F F and projections G G may be formed or cast in one piece or in sections as may be desired.

In the construction shown the containing frame of the electrode is vertically or longitudinally adjustable so as to permit of its being properly adjusted to the requirements of the size of the mass or block of active material contained therein, this adjustment being accomplished in the device shown in Figs. 1 and 2 of the drawings by means of the nuts E E.

A conductor K formed of any suitable metal is embedded in the active material A of the battery and terminates in a lug or pole L which passes through and is contained within a proper slot or aperture formed in the rubber plate D.

J J are holes or perforations in or through the active material to increase its surface area exposed to the electrolyte.

In the electrode or element shown in Figs.

3, 4, and 5, B² is a frame consisting of hard rubber or of other material unsusceptible to the action of electricity or to the acid of the electrolyte, and formed or molded in one piece, or in any suitable manner, and provided at the sides thereof with lugs E² to more securely hold the active material A in place within it. Within this frame B² and acting as the supporting device at the upper edge of the active material, is contained a plate D² formed of hard rubber or of other material unsusceptible to electricity or to the acid of the electrolyte and having at its respective ends grooves adapted to embrace the lugs E² formed upon the inner surfaces of the sides of said frame. Between this plate D² and the upper end piece of the frame B² are placed balls or buffers F² of soft rubber or of other yielding material unsusceptible to electricity or to the acid of the electrolyte.

Embedded within the active material A of the battery is a conductor K² formed of any suitable metal, the upper end of which passes through suitable slots or openings in the plate D² and in the upper bar of the frame B² and terminates in a lug or pole L².

In the device shown in Figs. 1 and 2 adjustment of the frame to the varying requirements of the size of the mass of active material contained therein is effected by the adjustment by hand of the nuts E E.

In the device shown in Figs. 3, 4, and 5, the adjustment of the containing frame to the requirements of the size of the mass of the active material contained therein is effected automatically by the expansive or contractive action of the rubber buffers or balls F².

In the use of the devices described as the negative elements of the battery, the adjustable features thereof are not necessary, but they in no way interfere with such use.

An active material which may with advantage be used in a positive electrode embodying my invention may be made by mixing together red lead and powdered charcoal in the proportion, by volume, of fifty per cent. of each of said materials, and by mixing therewith a sufficient quantity of a mixture of water and acetic acid to properly moisten the mass to enable it to be bound together, and to, when dry, form a plate or block. I have employed about one ounce of acetic acid to fifteen ounces of water, but these proportions as well as the proportions above named, of red lead and charcoal powder, may be varied, without departing from my invention.

The active material described forms the subject of an application for Letters Patent, which application is of even date herewith. Serial No. 340,043. This active material may, in a moist condition, be placed or packed directly within the containing frame shown in the drawings, or in any other containing frame, and around the conductors K or K² or in contact with any suitable conductor, and may by any suitable device, be provided with holes or apertures J J, and may then be allowed to dry in its frame, or the active material, in a moist condition, may be molded or formed, in a mold corresponding in size and form to the frame within which it is to be contained, and be then, when dry, placed in its containing frame, or the active material, may be formed or molded into blocks the dimension and configuration of a given number of which are such that they when placed side by side, will properly fill the containing frame in which the active material is to be employed, and may, be placed in said frame in contact, in any suitable manner, with a proper conductor.

Active material formed in blocks, and provided with holds or perforations, as above described, form the subject of separate applications for Letters Patent made by me and bearing even date herewith. Serial Nos. 340,044 and 340,045.

In case the electrode herein referred to is to be used as the negative element or electrode of the battery the active material may consist of litharge and of about three per cent. by weight, of acetate of lead powder. The acetate of lead powder may be made by boiling acetate of lead in dilute sulphuric acid until it melts and by then evaporating the mass until there is a residuum of dry acetate and sulphate of lead. This mixture of acetate and sulphate of lead is ground up and mixed with litharge in a dry condition, and is then placed either in the frame of the electrode in which the active material is to be contained, or in a proper mold as has above been described in connection with the preparation of active material for a positive electrode.

It is to be understood that containing frames of construction other than that hereinbefore described, and active material other than that hereinbefore referred to, may be employed without departing from the spirit of my invention.

Having thus described my invention, I claim:

An electrode for a secondary battery, consisting of an adjustable containing-frame formed of rubber or of other material unsusceptible to the action of electricity or to the acid of the electrolyte and containing active material and a proper conductor, substantially as described.

In testimony that I claim the foregoing as my invention I have hereunto signed my name this 4th day of February, A. D. 1890.

ISIDOR KITSEE.

In presence of—
F. NORMAN DIXON,
LEWIS ALTMAIER.